Dec. 7, 1926.
L. W. THOMPSON
FLOW METER AND THE LIKE
Filed Nov. 20, 1923
1,610,179
Fig.1.
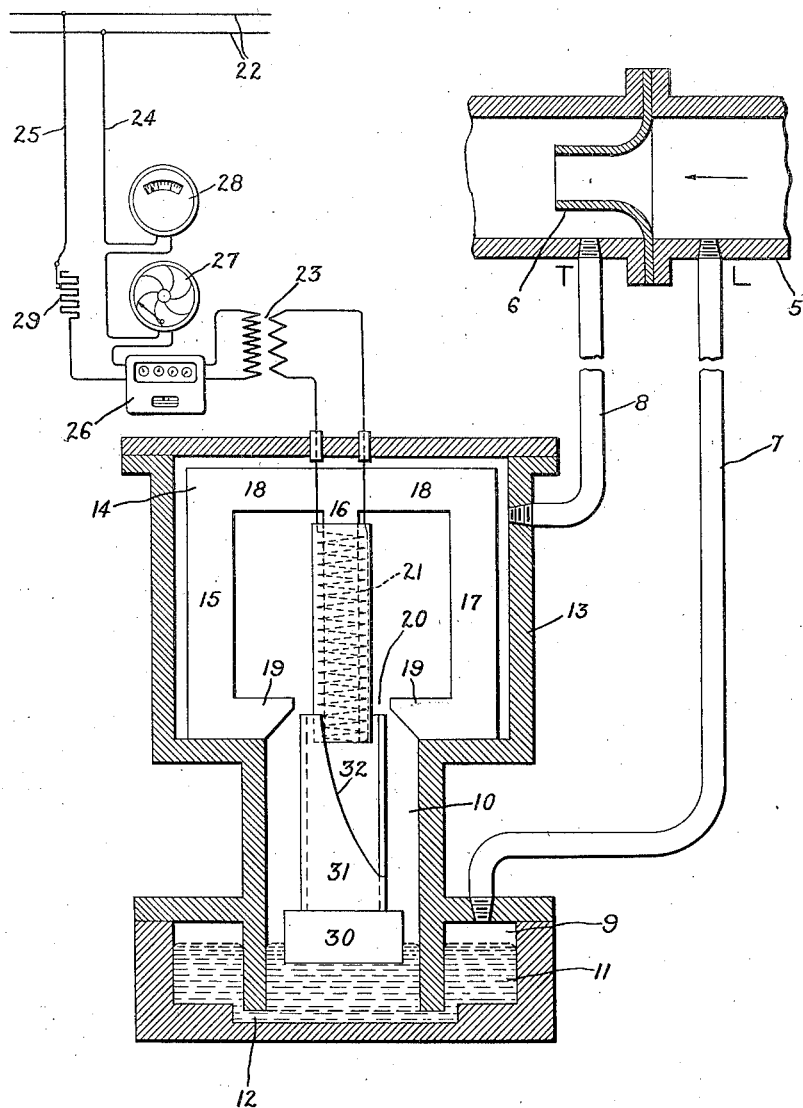
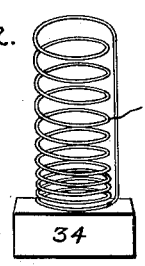
Fig.2.
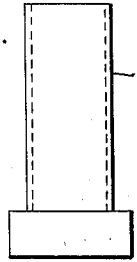
Fig.3.
Inventor:
Louis W. Thompson;
by *Alexander S. Smith*
His Attorney.

Patented Dec. 7, 1926.

1,610,179

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

FLOW METER AND THE LIKE.

Application filed November 20, 1923. Serial No. 675,947.

The present invention relates to flow meters for measuring the flow of fluids through conduits.

As is well known, the ordinary flow meter comprises: (a) a pressure difference-creating device which is placed in the conduit through which the fluid to be metered flows and creates a pressure difference proportional to the square of the flow; (b) a pressure responsive instrument of the U-tube type containing an indicating liquid such as mercury and to which the pressure difference is applied to effect deflections of the indicating liquid in the U-tube proportional thereto, and (c) some means for indicating, indicating and recording, or indicating, recording and integrating the amount of the liquid deflections either directly in terms of flow or in terms which may be converted into terms of flow. My invention relates to flow meters of this type wherein the deflections of the indicating liquid are utilized to effect a flow of electric current proportional to the flow of the fluid being metered, such current being measured to give a measure of the fluid flow. These are usually termed electric flow meters.

The object of my invention is to provide an improved electric flow meter which is simple in structure, accurate, reliable in operation, and easy to manufacture and calibrate.

In meters of this type, if the fluid flow is to be integrated it is necessary that the flow of current produced in the indicating circuit by the deflections of the indicating liquid be proportional to the square root of the deflections since such deflections are proportional to the square of the fluid flow, and a further object of the invention is to provide an electric meter wherein this condition may be met in a very simple and satisfactory manner.

For a consideration of what I believe to be novel and my invention, attention is directed to the accompanying description and the claims appended thereto.

In the drawing Fig. 1 is a diagrammatic view of a flow meter embodying my invention, and Figs. 2 and 3 are detail views showing modifications.

Referring to the drawing, 5 indicates a conduit through which a fluid to be metered flows and 6 a pressure difference creating device for creating a pressure difference which bears a definite relation to the rate of flow. Any suitable type of pressure difference creating device such as a Pitot tube, a Venturi tube or the like may be used, the device shown being a known type usually termed a flow tube. It is characteristic of all such devices that they create a pressure difference which is proportional to the square of the flow. The leading and trailing pressure sides of flow tube 6 are connected by conduits 7 and 8 to the leading and trailing legs 9 and 10 of a U-tube containing an indicating liquid 11, such as mercury for example. In the present instance the leading leg of the U-tube is in the form of an annular chamber and the trailing leg is in the form of a vertical tube, the lower end of which depends into the annular chamber to a point adjacent to its bottom, leaving a space 12 through which the two legs communicate with each other. The upper end of leg 10 is enlarged to form a housing 13 in which is located a transformer core 14 comprising three spaced legs 15, 16 and 17. Legs 15, 16 and 17 are joined together at their upper ends by top pieces 18. At their lower ends legs 15 and 17 are provided with bottom pieces 19 which project toward leg 16 but terminate short of it so as to leave a surrounding passage 20. Core 14 may be made up of laminations in the usual and well understood manner. On central leg 16 of the transformer core is a primary winding 21 enclosed in a casing of insulating material such as hard rubber which may be molded directly on the coil. Preferably winding 21 comprises a single layer as shown, although it may comprise two or more layers if found desirable.

The terminals of primary winding 21 are connected to a suitable source of alternating current of constant potential indicated at 22, the connections including suitable indicating instruments, so that the circuit forms an indicating circuit, and where this source is of the potential ordinarily met with, the connection is preferably made through a step down transformer so that only a low voltage is applied to primary winding 16.

The indicating instruments may be placed on either the low voltage or high voltage side of the step down transformer but preferably I place them on the high voltage side since standard instruments for such higher voltage are obtained more readily. In the drawing the step down transformer is indicated at 23 and its primary winding is connected by conductors 24 and 25 to line wires 22. In this indicating circuit is a watt hour meter 26, a curve drawing ammeter 27 and an indicating ammeter 28. In the circuit also is an adjustable resistance 29.

In leg 10 of the U-tube is a float 30 which rides on the liquid 11 and carried by float 30 is a short circuited secondary winding 31 which is shown in Fig. 1 as being in the form of a tube or sleeve made of suitable conducting material, such as copper. The tube or sleeve is of a size to pass through passage 20 and up around the middle leg 16 of the transformer core. The tube forms a closed secondary of a single turn and as it moves up and down around primary winding 21 it effects increases and decreases in the current flowing in the primary winding.

When there is no flow of fluid to be metered through conduit 5, no pressure difference is created by device 6 and the indicating liquid stands at the same level in U-tube legs 9 and 10. The arrangement is such that under this condition of zero flow sleeve 31 stands with its upper end surrounding the lower end of primary winding 21. There will be at this time some flow of current in primary winding 21 due to the transformer losses and to the fact that the upper end of sleeve 31 is around the lower end of primary winding 21. To take care of this the ammeters 27 and 28 are calibrated so that they will read zero with this current flowing through them, and watthour meter 26 is suitably compensated so that with this current flowing through it, it does not rotate. This is the condition of zero fluid flow. If, now, flow of the fluid to be metered takes place, a pressure difference will be created by device 6 which will cause the liquid in U-tube leg 9 to lower, and that in leg 10 to rise. This will raise float 30 and tube 31 and the latter, moving up around winding 21, will cause a greater amount of current to flow in winding 21. The increase in the flow of current in winding 21 will be proportional to the amount tube 31 is raised and hence to the flow of fluid being metered. To integrate the flow of fluid by means of watthour meter it is necessary for the flow of current in the indicating circuit to vary directly with the flow of fluid to be metered, and to effect this tube 31 may be suitably shaped as indicated at 32 so as to give this relation. The exact shape for the tube can be determined by experiment. In shaping the tube, it may be cut away at an angle as shown to provide an air gap of variable length in the tube thereby affecting the eddy current losses in the tube.

Instead of a tube 31 as shown in Fig. 1, I may form the tube of a coil of wire 33 as shown in Fig. 2, the turns in the coil being spaced apart to give the desired effect so that the current flow in the primary winding will be directly proportional to flow of fluid being metered. The two ends of coil 33 are connected together to form a closed winding. In Fig. 2, 34 indicates the float corresponding to float 30 of Fig. 1. If it is not desired or found necessary in any particular case to have the current flow in the primary winding 21 of the transformer directly proportional to the flow then I may use a tube as shown at 35 in Fig. 3 instead of a shaped tube as shown in Fig. 1. In this case the indicating instruments can be calibrated to read directly in terms of fluid flow. However, they will not have uniform scales as is well understood.

A meter embodying my invention has the advantage that it is simple in structure and embodies few moving parts. There are no delicate parts requiring careful adjustments. The indicating instruments may be standard electrical instruments and are easily obtainable, accurate, and efficient. By varying the relative areas of the two legs of the U-tube and by using indicating liquids of different specific gravities in the U-tube, the instrument can be readily adapted for the various conditions of flow met with. That is, it can be adapted for conditions where either relatively large pressure difference is available for operating the instrument or where only a small one is available.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In combination, walls forming a tube, a transformer core in the upper portion of the tube, said core having a plurality of legs, one of which is located centrally of the tube, a primary winding on said centrally located leg, an indicating circuit connected thereto, liquid in the tube, a float which rides on such liquid, and means forming a closed secondary which is carried by said float and is moved by it relatively to the primary transformer winding.

2. In combination, walls forming a tube, a transformer core in the upper portion of the tube, said core having a plurality of legs, one of which is located centrally of the tube, a primary winding on said centrally located leg; an indicating circuit connected thereto, liquid in the tube, a float which rides on such liquid, and a tubular member carried by said float which member forms a closed secondary winding for the transformer, the material forming said tubular member being distributed in such manner that in moving relatively to said primary transformer winding there is induced in such primary winding a current proportional to the square root of the amount of movement of said tubular member.

In witness whereof, I have hereunto set my hand this 19th day of November, 1923.

LOUIS W. THOMPSON.